(12) United States Patent
Pendl et al.

(10) Patent No.: US 11,869,290 B2
(45) Date of Patent: Jan. 9, 2024

(54) KEY STORAGE DEVICE

(71) Applicant: KNAPP AG, Hart bei Graz (AT)

(72) Inventors: Marc Pendl, Hart bei Graz (AT);
Alexander Resch, Hart bei Graz (AT);
Johannes Hutter, Hart bei Graz (AT);
Wolfgang Puntigam, Hart bei Graz (AT); Franz Mathi, Hart bei Graz (AT)

(73) Assignee: KNAPP AG, Hart bei Graz (AT)

( * ) Notice: Subject to any disclaimer, the term of this patent is extended or adjusted under 35 U.S.C. 154(b) by 0 days.

(21) Appl. No.: 17/637,373

(22) PCT Filed: Aug. 14, 2020

(86) PCT No.: PCT/AT2020/060306
§ 371 (c)(1),
(2) Date: Feb. 22, 2022

(87) PCT Pub. No.: WO2021/035263
PCT Pub. Date: Mar. 4, 2021

(65) Prior Publication Data
US 2022/0284750 A1    Sep. 8, 2022

(30) Foreign Application Priority Data

Aug. 23, 2019  (AT) .............................. A 50732/2019

(51) Int. Cl.
*G07C 9/00* (2020.01)
*E05B 19/00* (2006.01)
(Continued)

(52) U.S. Cl.
CPC ...... *G07C 9/00896* (2013.01); *E05B 19/0005* (2013.01); *E05B 41/00* (2013.01);
(Continued)

(58) Field of Classification Search
CPC ................. G07C 9/00896; G07C 9/33; G07C 2009/00936; E05B 19/0005; F16P 3/08
See application file for complete search history.

(56) References Cited

U.S. PATENT DOCUMENTS

2004/0160304 A1    8/2004  Mosgrove et al.
2015/0061822 A1*   3/2015  Burdenko ............. H01H 9/285
                                               340/5.6
(Continued)

FOREIGN PATENT DOCUMENTS

| CN | 109674249 A | 4/2019 |
| DE | 102015102021 A1 | 8/2016 |
| WO | 2006064467 A3 | 6/2006 |

OTHER PUBLICATIONS

International Search Report and Written Opinion, PCT/AT2020/060306, dated Nov. 24, 2020, PCT filing date Aug. 14, 2020.

*Primary Examiner* — Daniell L Negron
(74) *Attorney, Agent, or Firm* — Workman Nydegger

(57) ABSTRACT

A key storage device for storing a key provided with an identification code, including a locking unit which has an unlocked state in which the key can be removed from the key storage device, and a locked state in which the key is locked in or on the key storage device. The key storage device includes a control unit connected to the locking unit and having a data interface, the control unit operable to read out the identification code of the key and to provide the identification code of the key at the data interface.

19 Claims, 3 Drawing Sheets

(51) Int. Cl.
*F16P 3/08* (2006.01)
*G07C 9/33* (2020.01)
*E05B 41/00* (2006.01)

(52) U.S. Cl.
CPC ................. *F16P 3/08* (2013.01); *G07C 9/33* (2020.01); *G07C 2009/00936* (2013.01)

(56) References Cited

U.S. PATENT DOCUMENTS

2016/0371908 A1* 12/2016 Dow ....................... F16P 3/147
2018/0012434 A1   1/2018 Power
2019/0085616 A1   3/2019 Soufflet

* cited by examiner

KEY STORAGE DEVICE

The present application is a U.S. National Stage of International Application No. PCT/AT2020/060306, filed on Aug. 14, 2020, designating the United States and claiming the priority of Austrian Patent Application No. A50732/2019 filed with the Austrian Patent Office on Aug. 23, 2019. All of the aforementioned applications are incorporated herein in their respective entireties by this reference.

The invention relates to a key storage device for storing at least one key provided with an identification code, comprising a locking unit which has an unlocked state in which the key can be removed from the key storage device, and a locked state in which the key is locked in or on the key storage device.

Furthermore, the invention relates to a system for a danger area with at least one machine comprising a machine control unit, an access door to the danger area, the door being assigned to at least one key, and a key storage device.

Moreover, the invention relates to a method of securing a danger area with a security system.

Key storage devices are used in many areas in order to limit access to a key to a certain group of persons. In apartment buildings, for example, it is advantageous to limit access to a technical area to technical staff for maintenance and repair work. Furthermore, key storage devices are used as part of security systems, in particular in production plants or machine rooms, in order to store one or more keys that enable access to a danger area. In this way, it is ensured that only qualified personnel enter the danger area. Such security systems allow procedures for securing a danger area to be established, which ensure controlled access to and controlled exit from the danger area.

Security keys generally have an identification code by means of which the key is clearly identifiable and assignable to a specific lock. Key storage devices known from the prior art for storing at least one key provided with an identification code comprise a locking unit which has an unlocked state and a locked state. Key storage devices according to the prior art, however, have the disadvantage that, in the locked state of the locking unit, there is no possibility of determining which key is stored in the key storage device. In addition, conventional key storage devices do not allow any control as to whether the removed key is indeed again stored in the key storage device after it has been used. Consequently, there is the risk that security keys will be lost or that an incorrect key will be deposited in the key storage device. This results in an increased risk that security systems for danger areas as known from the prior art, or known methods for securing danger areas, are circumvented.

It is an object of the present invention to form a key storage device for storing at least one key provided with an identification code, a security system for a danger area, and a method of securing a danger area, which avoid the disadvantages of the prior art.

According to the invention, the present object is achieved in that the key storage device comprises a control unit connected to the locking unit and having at least one data interface, the control unit being designed for reading out the identification code of the key and providing it at the data interface.

Furthermore, the object is achieved by providing a security system having the features of claim 16 and a method of securing a danger area having the features of claim 17.

The key storage device according to the invention for storing at least one key provided with an identification code comprises a locking unit. Said unit has an unlocked state in which the key can be removed from the key storage device, and a locked state in which the key is locked in or on the key storage device. According to the invention, the key storage device comprises a control unit connected to the locking unit and having a data interface, the control unit being designed for reading out the identification code of the key and providing it at the data interface. This enables the identification code of the key deposited in the key storage device to be read out at any time, for example by means of a network query from a network computer. In this way, a possibility is provided to identify when the key is removed from the key storage device according to the invention. In addition, the key storage device according to the invention allows to have control as to which key or, respectively, whether the correct key has been deposited in the key storage device.

According to a preferred embodiment of the key storage device according to the invention, the control unit is designed for comparing the identification code of the key with a list of identification codes having at least one entry and transferring it from the unlocked state into the locked state preferably if the identification code of the key matches an entry in the list. In this way, a check is provided as to whether a certain key defined as approved or, respectively, registered in advance has been deposited in the key storage device. In addition, the possibility is provided to lock only approved keys in or on the key storage device, whereby it becomes impossible to store a key that has not been registered and keys are prevented from being mixed up. In addition, the control unit is preferably designed for delivering information on the matching of the identification code of the key with an entry in the list to the at least one data interface.

The key storage device preferably comprises a lock connected to the locking unit for locking and/or unlocking the locking unit. In this way, the possibility is provided to remove the key locked on the key storage device by manually unlocking the locking unit, for example by means of a master key, a transponder or the like.

According to the invention, the control unit is designed for providing information about the locking state of the locking unit at the data interface and/or for receiving control information for locking and/or unlocking the locking unit via the data interface and for locking and/or unlocking the locking unit on the basis of the control information. As a result, the advantage is obtained that the locking unit can be unlocked or locked remotely, and the state of the locking unit can be read out in a decentralized manner and thus, for example, without visual connection to the key storage device or, respectively, from a location remote from the key storage device.

According to the preferred embodiment, the key storage device comprises an operating element connected to the control unit for entering control information, the control unit preferably being designed for providing inputs made on the operating element at the data interface. As a result, the advantage is obtained that the operating element can be used for inputting control information for locking or unlocking the locking unit. In addition, every input made via the operating element can be read out, for example, by means of a computer connected to the data interface. For this purpose, the operating element preferably comprises an iris scanning device, a camera, a keypad, a fingerprint scanner, and/or a microphone. This enables user verification and identification using various input methods.

The key storage device advantageously comprises at least one receptacle preferably designed as a hole for receiving a blocking element preferably designed as a padlock for blocking a connection of the key to the locking unit. In this way, the possibility is provided to block the key storage device for a subsequent user in order to prevent the key storage device from being occupied by a key while the key assigned to the key storage device is in use.

The key storage device preferably comprises a signalling unit connected to the control unit, the signalling unit being designed for outputting an optical and/or acoustic signal in the locked and/or unlocked state of the locking unit. In this way, users of the key storage device can be informed about the presence or absence of a key. According to the preferred embodiment of the key storage device according to the invention, the signalling unit is furthermore designed for outputting information provided by the data interface.

According to the preferred embodiment variant, the control unit comprises an RFID reading unit for reading out the identification code of the key. In this way, the identification code can be read out in a contactless manner.

According to the invention, the key storage device comprises an identification unit which is connected to the key and exhibits the identification code of the key. As a result, the advantage is obtained that keys without an identification code can also be provided therewith and can be used with the key storage device according to the invention. The locking unit is preferably designed for locking the identification unit on the key storage device.

In the preferred embodiment, the key storage device has a receiving area for accommodating the identification unit at least partially, the locking unit being designed for engaging the identification unit in the receiving area in the locked state. As a result, the advantage is obtained that the key can be fastened in or on the key moving device via the identification unit. In addition, the receiving area preferably has an accommodation guide, the at least one receptacle being designed for receiving the blocking element in the accommodation guide. The blocking element is designed for engaging the receptacle of the accommodation guide in order to block the connection of the key to the locking unit. The receptacle is preferably designed as a hole in the accommodation guide.

The security system according to the invention for a danger area comprising at least one machine having a machine control unit has an access door to the danger area, the door being assigned to at least one key, and a key storage device according to the invention. The machine control unit is connected to the key storage device and designed for enabling an operating state of the machine and/or for moving it from an operating state into a security state when the locking unit is transferred from the locked state into the unlocked state, after the identification code of the at least one key of the access door has been determined by the control unit of the key storage device. As a result, the advantage is obtained that the operation of a machine constituting a source of danger is linked to the removal or, respectively, the depositing of a key for an access door to the danger area in which the machine is located. If the key is removed and the locking unit is unlocked, the machine is automatically put into the security state by the machine control unit, whereby the source of danger in the danger area is eliminated. Conversely, the operating state of the machine is enabled only as soon as the key is locked in or on the key storage device. The machine control unit is preferably designed for moving the machine from the operating state into the security state when the identification unit connected to the key is removed from the accommodation guide as determined by the control unit.

The method according to the invention of securing a danger area with the security system according to the invention comprises the steps of:
unlocking the locking unit;
removing the key from the key storage device;
moving the machine into the security state with the machine control unit;
preferably attaching the blocking element at the key storage device;
opening the access door with the key and entering the danger area.

In addition, the method according to the invention preferably comprises the steps of:
leaving the danger area and closing the access door with the key;
preferably removing the blocking element from the key storage device;
connecting the key to the key storage device;
reading out the identification code of the key with the control unit;
comparing the identification code with the list of identification codes by the control unit;
enabling the operating state of the machine if the identification code of the key matches at least one entry in the list of identification codes.

According to the preferred embodiment of the method according to the invention, the step of:
transferring the locking unit from the unlocked state into the locked state if the identification code of the key matches an entry in the list
is additionally included.

The method according to the invention preferably comprises the step of:
registering an intended access to the danger area at the machine control unit by actuating the operating element.

Advantageous embodiments of the key storage device according to the invention, the security system according to the invention and the method according to the invention of securing a danger area as well as alternative embodiment variants are explained in further detail below with reference to the figures.

Figure 1:
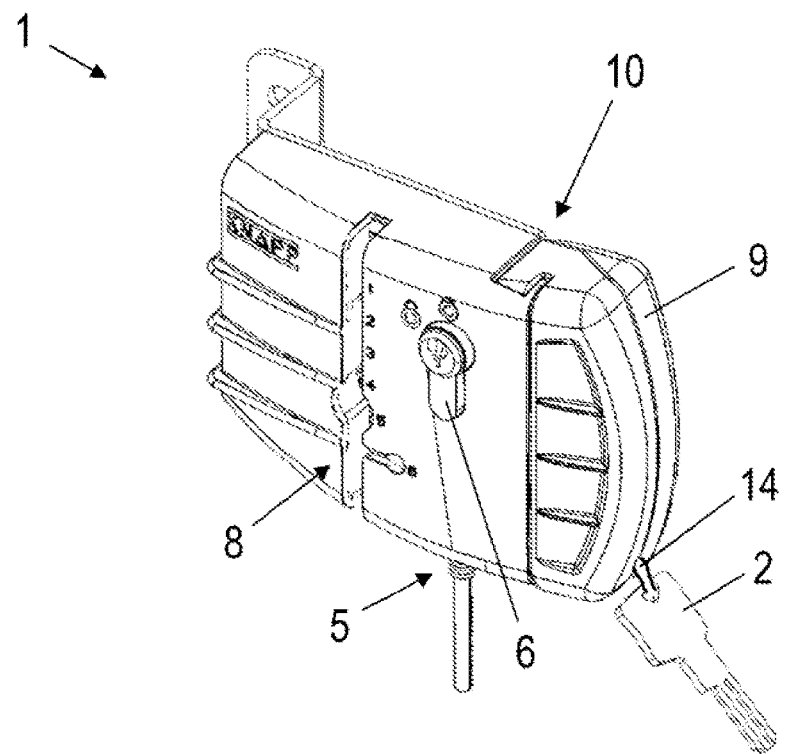
FIG. 1 shows a perspective view of a key storage device according to the invention.

FIG. 1 shows a key storage device 1 according to the invention for storing at least one key 2 provided with an identification code. The key storage device 1 comprises a locking unit 3, which is not illustrated in FIG. 1 and is visible in FIG. 2 and FIG. 5. The locking unit 3 has an unlocked state in which the key 2 can be removed from the key storage device 1, and a locked state in which the key 2 is locked in or on the key storage device 1. In addition, the key storage device 1 comprises a control unit 4 connected to the locking unit 3 and having a data interface 5, which control unit is shown in detail in FIG. 5, the control unit 4 being designed for reading out the identification code of the key 2 and providing it at the data interface 5. For this purpose, the control unit 4 preferably comprises an RFID reading unit for reading out the identification code of the key 2, which reading unit is not shown in the figures. By reading out the identification code of the key 2 by the control unit 4 and providing the identification code at the data interface 5, the advantage is obtained that the identification code of the key 2 can be queried at any time by means of a data connection to the data interface 5. In addition, it can thus be determined whether a specific key 2 is stored in or on the key storage device 1. Furthermore, the control unit 4 is preferably designed for comparing the identification code of the key 2 with a list of identification codes having at least one entry. This enables the identification code to be compared with a database of identification codes, as a result of which it can be determined whether the correct key 2 is stored in a key storage device 1 assigned to this key 2. In this way, keys 2 can be prevented from being mixed up. The control unit 4 is preferably designed for transferring the locking unit 3 from the unlocked state into the locked state if the identification code of the key 2 matches an entry in the list. As a result, it is ensured that only keys 2 intended for this specific key storage device 1 are stored in or, respectively, on said device.

As illustrated in FIG. 1, the key storage device 1 according to the invention comprises, according to the preferred embodiment, a lock 6 connected to the locking unit 3 for locking and/or unlocking the locking unit 3. According to a preferred embodiment variant, the locking unit 3 is designed as a lock bit 7 of the lock 6, which is visible in FIG. 2, but may comprise further locking mechanisms known to a person skilled in the art in alternative embodiment variants, such as locking bolts or locking pins. As a result, the advantage is obtained that the locking unit 3 can be unlocked with a master key for removing the key 2 stored on the key storage device 1.

According to a preferred embodiment of the key storage device 1 according to the invention, the control unit 4 is designed for providing information about the locking state of the locking unit 3 at the data interface 5. As an alternative or in addition to this, the control unit 4 can receive control information for locking and/or unlocking the locking unit 3 via the data interface 5 and can lock and/or unlock the locking unit 3 on the basis of the control information. As a result, the locking unit 3 can be controlled remotely by means of the data interface 5. Moreover, the key storage device 1 preferably comprises an operating element for inputting control information, which is connected to the control unit 4 and is not illustrated in the figures. Via the operating element, a user of the key storage device 1 according to the invention can thus make inputs, for example, for locking and/or unlocking the locking unit 3. The control unit 4 preferably delivers this input to the data interface 5, as a result of which it can be transmitted to a data network, for example. For this purpose, the operating element preferably comprises an iris scanning device, a camera, a keypad, a fingerprint scanner, and/or a microphone. The locking unit 3 preferably comprises a spring mechanism for retaining the locking unit 3 in the locked state, unless it is unlocked by the control unit 4 or a user.

As illustrated in FIG. 1, the key storage device 1 preferably comprises a signalling unit 8 connected to the control unit 4. The signalling unit 8 outputs an optical and/or acoustic signal in the locked and/or unlocked state of the locking unit 3. For this purpose, the signalling unit 8 may comprise several LED light sources and/or also loudspeakers, as can be seen from the figures. In addition, a preferably touch-sensitive display, which is not shown in the figures, can be provided which can also function as an operating element. Furthermore, the signalling unit 8 can output information provided by the data interface 5. As a result, it is apparent already from a distance in which state the key storage device 1 is or, respectively, whether a key 2 is currently being stored in or on it. In addition, a user interface is provided as a result.

Figure 2:
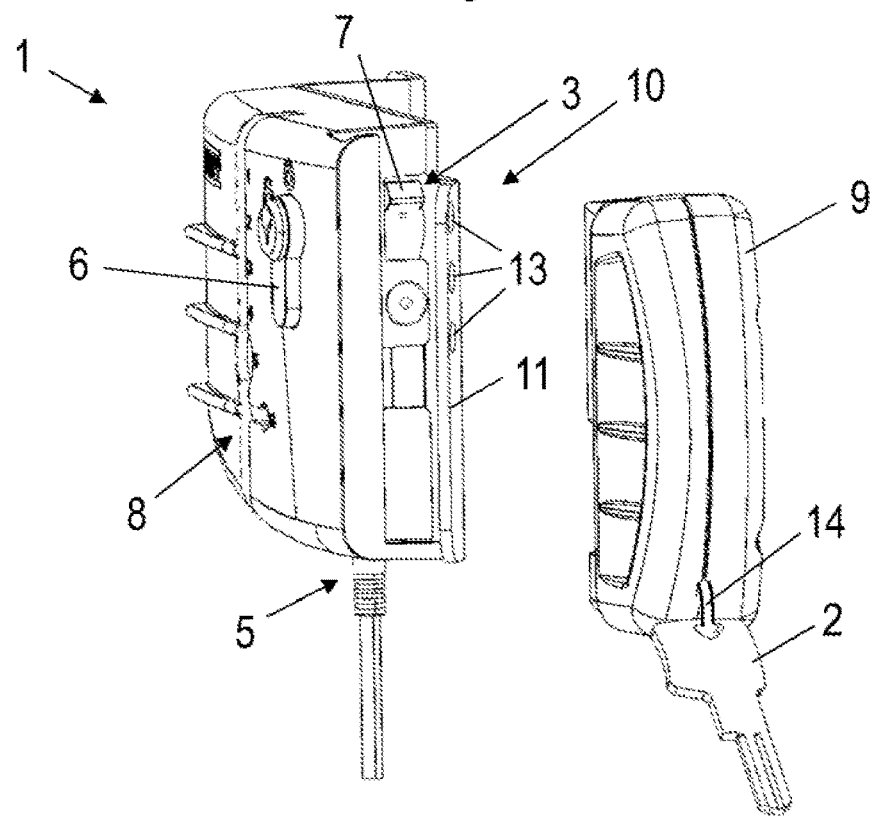
FIG. 2 shows a side view of the key storage device with a locking unit.
Figure 3:
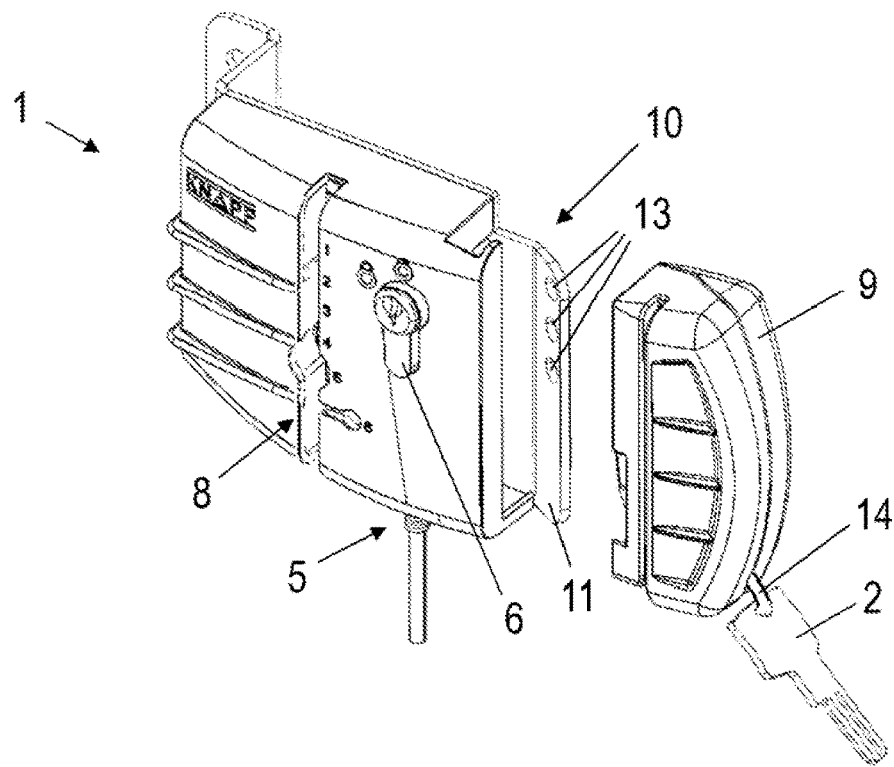
FIG. 3 shows the key storage device with an accommodation guide.
Figure 4:
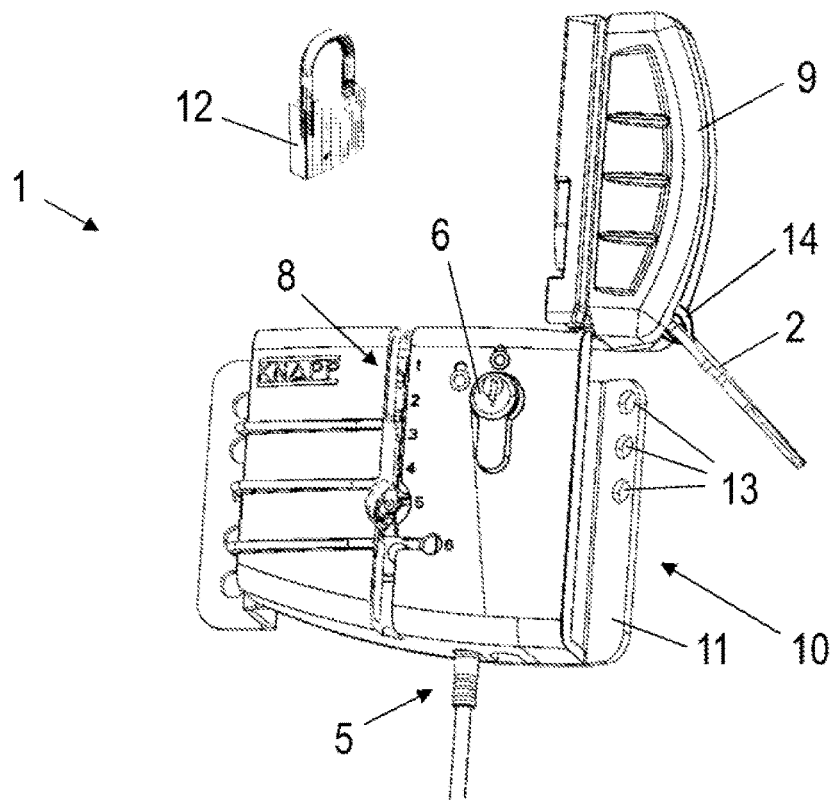
FIG. 4 shows the key storage device with a blocking element.

In the preferred embodiment variant, the key storage device 1 comprises an identification unit 9 connected to the key 2 and having the identification code of the key 2, which identification unit is depicted separately from a main body of the key storage device 1 in FIG. 2 and FIG. 3. The identification unit 9 is locked with the locking unit 3 to store the key 2 on the key storage device 1. The identification unit 9 provides the advantage that keys 2 without an identification code can also be provided therewith and can be used with the key storage device 1 according to the invention. The key storage device 1 preferably has a receiving area 10 for accommodating the identification unit 9 at least partially, which is illustrated in FIG. 3. In this embodiment variant, the locking unit 3 is designed for engaging the identification unit 9 in the receiving area 10 in the locked state. Rigid attachment of the identification unit 9 is thus ensured. Preferably, the receiving area 10 furthermore has an accommodation guide 11, which, in the preferred embodiment variant, is designed as a bent sheet metal. FIG. 4 shows the insertion of the identification unit 9 into the receiving area 10, with the accommodation guide 11 ensuring straight guidance of the identification unit 9 and thus secure locking by the locking unit 3. According to the preferred embodiment variant, the key storage device 1 furthermore comprises a blocking element 12, which is also illustrated in FIG. 4. The blocking element 12 is preferably designed as a padlock. If necessary, the blocking element 12 blocks the connection of the key 2 to the locking unit 3 by engaging the accommodation guide 11. For this purpose, the accommodation guide 11 preferably has at least one receptacle 13 designed as a hole for receiving the blocking element 12. According to alternative design variants, the accommodation guide 11 has, for example, two, three or more receptacles 13 designed as holes for receiving one or several blocking elements 12. In FIG. 4, an accommodation guide 11 with three receptacles 13 is illustrated. As a result, the advantage is obtained that the connection of the key storage device 1 to a key 2 can be blocked by a user.

Figure 5:
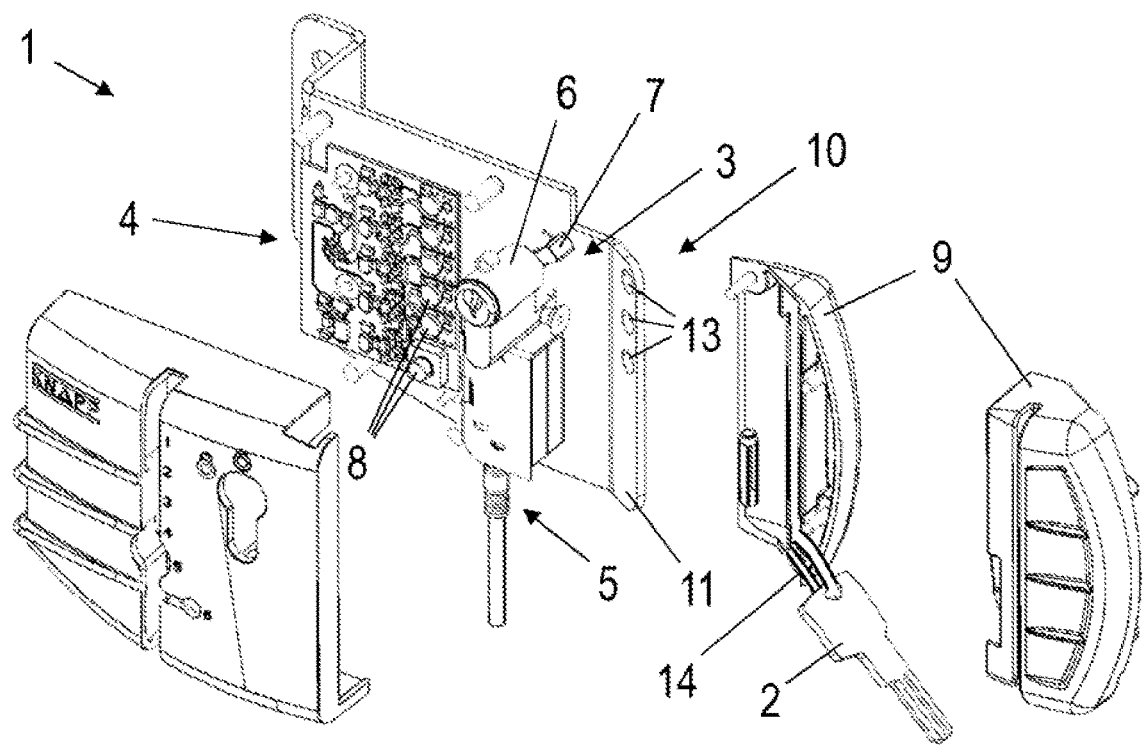
FIG. 5 shows an exploded view of the key storage device according to the invention.

FIG. 5 shows an exploded view of the key storage device 1 according to the invention, wherein the control unit 4 can be seen, which is designed as an electronic component. In the embodiment variant of the key storage device 1 according to the invention as illustrated in FIG. 5, the key 2 is connected to the identification unit 9 with an eyelet 14 preferably made of metal, wherein this connection is not separable by a user of the key storage device 1 without the application of considerable force or the use of cutting tools. In this embodiment variant, the connection of the identification unit 9 and the key 2 is separable in a non-destructive manner only by dismantling the identification unit 9 into its component parts. For this purpose, a sheath of the identification unit 9 can be constructed, for example, with connecting means, the opening and closing of which requires specialized tools.

Figure 6:
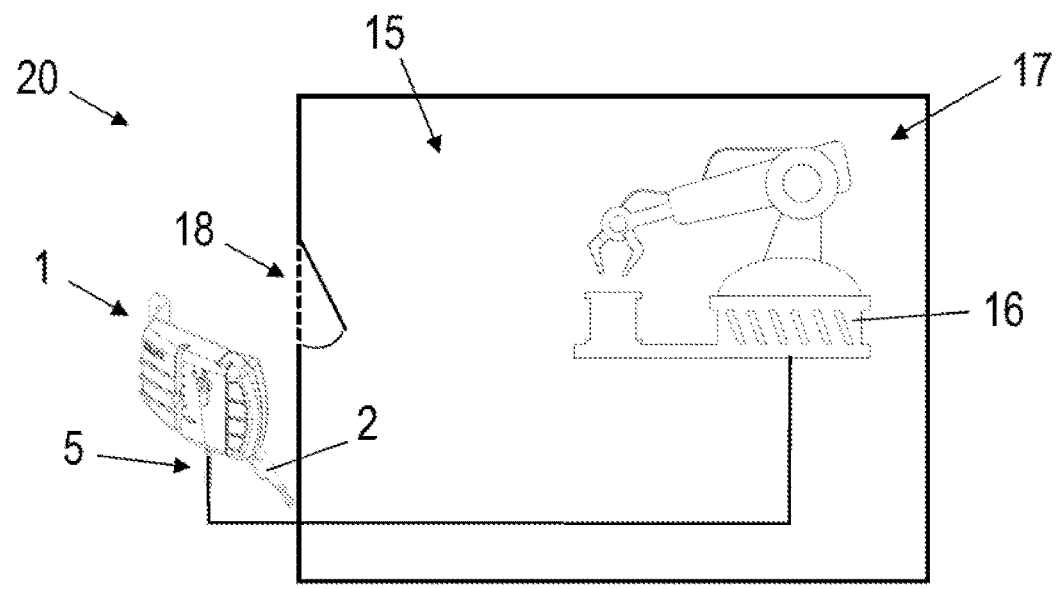
FIG. 6 shows a security system according to the invention for a danger area.

A security system 20 according to the invention for a danger area 15 exhibiting at least one machine 17 comprising a machine control unit 16 is illustrated in FIG. 6 and comprises an access door 18 to the danger area 15, the door being assigned to at least one key 2, and a key storage device 1 according to the invention. The key 2 shuts the lock in the access door 18. The key storage device 1 is connected, preferably via the data interface 5, to the machine control unit 16, which enables an operating state of the machine 17 after the identification code of the at least one key 2 has been determined by the control unit 4 of the key storage device 1. As an alternative or in addition to this, the machine control unit 16 moves the machine 17 from the operating state into a security state when the locking unit 3 is transferred from the locked state into the unlocked state. As a result, the advantage is obtained that the operating state of the machine 17 is only maintained as long as the key 2 is located in or on the key storage device 1 and consequently cannot be used for unlocking the access door 18. As a result, the security of a plant is increased in which the security system 20 according to the invention is used. In particular, it is advantageous to use the security system 20 according to the invention in halls with machines 17 in the form of automatic storage systems, robot systems and the like. In addition, several machines 17 and their machine control units 16 can also be connected to the key storage device 1. Furthermore, the key storage device 1 and/or the access door 18 is/are preferably connected to an alarm system. In general, any machine 17 which has a machine control unit 16 can be used with the security system 20 according to the invention. In addition, the access door 18 can have a door contact which is connected to the machine control unit 16 and which puts the machine 17 into the security state when the access door 18 is opened. Furthermore, the machine control unit 16 can keep the machine 17 in the security state until the access door is locked with the key 2 and can enable the operating state of the machine only when the key 2 is stored again in the key storage device 1. According to an alternative embodiment variant, the machine control unit 16 is designed for moving the machine 17 from the operating state into the security state when the identification unit 9 connected to the key 2 is removed from the accommodation guide 11 as determined by the control unit 4.

The method according to the invention of securing a danger area 15 with the security system 20 according to the invention comprises the step of unlocking the locking unit 3. Subsequently, the machine 17 is put into the security state by the machine control unit 16. In a preferred embodiment variant, this process is indicated to a user by means of a progress presentation via a display on the operating element of the key storage device 1. Alternatively, the machine 17 can be put into the security state also by entering control information on the operating element of the key storage device 1 before the locking unit 3 is unlocked. Subsequently, the key 2 is removed from the key storage device 1 and the blocking element 12 is preferably attached to the key storage device 1. Thereupon, the access door 18 is opened with the key 2 and the danger area 15 is entered. In this way, it is ensured that the machine 17 in the danger area 15 is not a source of danger.

Preferably, the method according to the invention furthermore comprises a sequence of process steps for leaving the danger area 15, including leaving the danger area 15 and locking the access door 18 with the key 2. Subsequently, the blocking element 12 is preferably removed from the key storage device 1 and the key 2 is connected to the key storage device 1 or, respectively, introduced into the key storage device 1 or attached thereto. Thereupon, the identification code of the key 2 is read out with the control unit 4 and compared with the list of identification codes by the control unit 4. If the identification code of the key 2 matches at least one entry in the list of identification codes, the operating state of the machine 17 is enabled by the machine control unit 16.

According to the preferred embodiment of the method according to the invention, the locking unit 3 is furthermore transferred from the unlocked state into the locked state if the identification code of the key 2 matches an entry in the list. In addition, the method preferably comprises the step of putting the machine 17 into operation by means of a user input on the operating element. Furthermore, the method according to the invention preferably comprises registering an intended access to the danger area 15 on the machine control unit 16 by a user actuating the operating element.

The invention claimed is:

1. A security system for a danger area which comprises a machine having a machine control unit, the security system comprising an access door to the danger area, the door being assigned to a key, and a key storage device operable to store the key, the key being provided with an identification code, wherein the key storage device comprises a locking unit having an unlocked state in which the key is removable from the key storage device and a locked state in which the key is locked in, or on, the key storage device, wherein the key storage device comprises a control unit connected to the locking unit and having a data interface, and the control unit operable to read out the identification code of the key and providing the identification code of the key at the data interface, wherein the key storage device comprises a receptacle, configured as a hole, configured to receive a blocking element which is independent of the key storage device, and comprising a padlock, for blocking a connection of the key to the key storage device, wherein the machine control unit is connected to the key storage device and operable to release, upon identification of the identification code of the key of the access door by the control unit of the key storage device, an operating state of the machine and/or upon transferring the locking unit from the locked state to the unlocked state, to set the machine from the operating state to a security state.

2. A security system according to claim 1, wherein the control unit is operable to compare the identification code of the key with a list of identification codes having at least one entry and transferring the key from the unlocked state into the locked state if the identification code of the key matches an entry in the list, and the control unit is operable to deliver information on the matching of the identification code of the key with an entry in the list to the data interface.

3. A method of securing a danger area with a security system according to claim 2, comprising the operations:
   unlocking the locking unit;
   removing the key from the key storage device;
   moving the machine into the security state with the machine control unit;
   attaching the blocking element at the key storage device; and
   opening the access door with the key and entering the danger area.

4. A method according to claim 3, further comprising the operations:
   leaving the danger area and closing the access door with the key;
   removing the blocking element from the key storage device;
   connecting the key to the key storage device;
   reading out the identification code of the key by the control unit;
   comparing the identification code with the list of identification codes by the control unit; and enabling the operating state of the machine if the identification code of the key matches at least one entry in the list of identification codes.

5. A method according to claim 4, further comprising transferring the locking unit from the unlocked state into the locked state when the identification code of the key matches an entry in the list.

6. A method according to claim 3, further comprising registering an intended access to the danger area at the machine control unit by actuating the operating element.

7. The security system according to claim 1, wherein the key storage device comprises a lock connected to the locking unit for locking and/or unlocking the locking unit.

8. The security system according to claim 1, wherein the control unit is operable to deliver information about the locking state of the locking unit to the data interface and/or is operable to receive control information usable for locking and/or unlocking the locking unit via the data interface and usable for locking and/or unlocking the locking unit on the basis of the control information.

9. The security system according to claim 1, wherein the key storage device comprises an operating element connected to the control unit operable to enter control information, the control unit operable to provide inputs made on the operating element at the data interface.

10. The security system according to claim 9, wherein the operating element comprises an iris scanning device, a camera, a keypad, a fingerprint scanner, and/or a microphone.

11. The security system according to claim 1, wherein the key storage device comprises a signalling unit connected to the control unit, and the signalling unit operable to output an optical and/or acoustic signal in the locked and/or unlocked state of the locking unit.

12. The security system according to claim 11, wherein the signalling unit is operable to output information provided by the data interface.

13. The security system according to claim 1, wherein the control unit comprises an RFID reading unit operable to read out the identification code of the key.

14. The security system according to claim 1, wherein the key storage device comprises an identification unit which is connected to the key and, in operation, exhibits the identification code of the key.

15. The security system according to claim 14, wherein the locking unit is operable to lock the identification unit on the key storage device.

16. The security system according to claim 15, wherein the key storage device has a receiving area configured to at least partially accommodate the identification unit, the locking unit configured to engage the identification unit in the receiving area in the locked state.

17. The security system according to claim 1, wherein the receiving area has an accommodation guide, the blocking element configured to engage the accommodation guide in order to block the connection of the key to the locking unit.

18. The security system according to claim 17, wherein the at least one receptacle is formed in the accommodation guide.

19. The security system according to claim 17, wherein the machine control unit is operable to move the machine from the operating state into the security state when the identification unit connected to the key is removed from the accommodation guide as determined by the control unit.

* * * * *